(No Model.)
H. M. BYLLESBY & O. B. SHALLENBERGER.
SYSTEM OR CIRCUIT FOR ELECTRICAL DISTRIBUTION.
No. 366,376. Patented July 12, 1887.
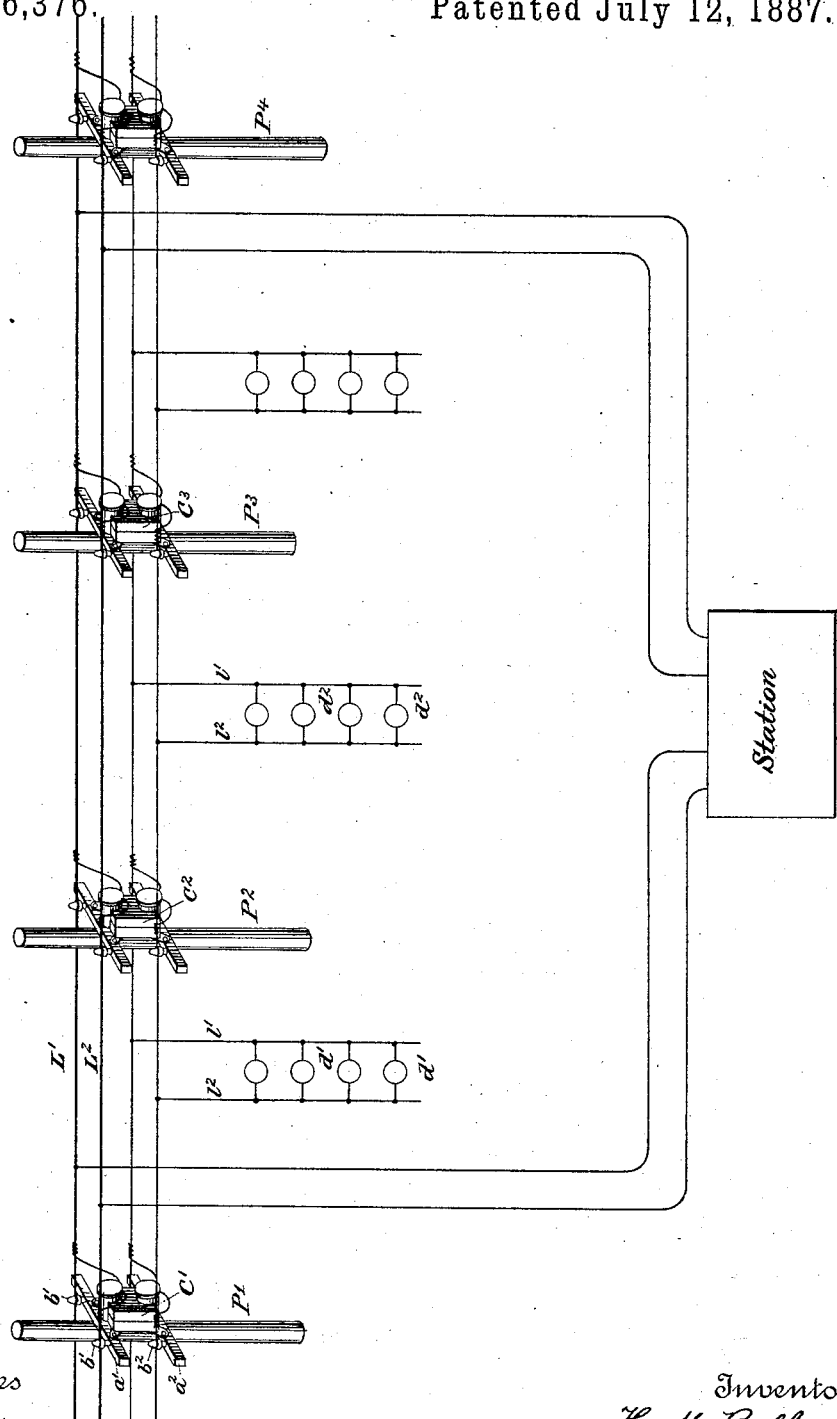
Witnesses
Geo. W. Breck.
Carrie E. Ashley
Inventors
H. M. Byllesby
O. B. Shallenberger
By their Attorneys
Pope & Edgecomb

United States Patent Office.

HENRY M. BYLLESBY, OF PITTSBURG, AND OLIVER B. SHALLENBERGER, OF ROCHESTER, ASSIGNORS TO GEORGE WESTINGHOUSE, JR., OF PITTSBURG, PENNSYLVANIA.

SYSTEM OR CIRCUIT FOR ELECTRICAL DISTRIBUTION.

SPECIFICATION forming part of Letters Patent No. 366,376, dated July 12, 1887.

Application filed March 3, 1887. Serial No. 229,519. (No model.)

*To all whom it may concern:*

Be it known that we, HENRY M. BYLLESBY and OLIVER B. SHALLENBERGER, citizens of the United States, residing, respectively, in Pittsburg, in the county of Allegheny, and Rochester, in the county of Beaver, both in the State of Pennsylvania, have invented certain new and useful Improvements in Systems of Circuits for Electrical Distribution, of which the following is a specification.

The invention relates to an organization of circuits and a plan of running wires employed in a system of secondary distribution, whereby the primary and secondary conductors may be maintained at a distance from each other, and convenient access may be had for the purpose of leading off subsidiary conductors or feeders, and also a method of maintaining the proper difference of potential upon the secondary circuit.

The general plan of the invention is to extend the primary conductors along one set of cross-arms of a line of poles, preferably the upper arms, and the secondary conductors along the lower arms. The converters are mounted upon the poles at convenient distances, the primary coils being connected in circuit with the primary conductors, while the secondary coils have their terminals connected with the secondary conductors. The feeders are led from the secondary conductors at the desired points, and the converters are inserted wherever required for maintaining a constant difference of potential throughout the secondary circuit.

The accompanying drawing is a diagram illustrating an organization of circuits based upon the plan of this invention.

Referring to the figure, P' P² P³, &c., represent a series of poles designed to carry the conductors employed in a system of electrical distribution—for instance, an electric-lighting system. These poles are each provided with two cross-arms, $a'$ $a^2$. The primary circuit L' L² extends along the line of poles, being supported by suitable insulators, $b'$ $b'$, carried by the upper arms, $a'$ $a'$. The secondary conductors are in like manner supported from the lower cross-arms, $a^2$, by insulators $b^2$ $b^2$. At convenient points feeders $l'$ $l'$ and $l^2$ $l^2$ are led off to supply translating devices $d'$ $d'$ $d^2$ $d^2$. Heretofore it has been customary to lead the secondary conductors directly to the points where the currents are to be used; but by the present invention the secondary circuit is parallel with a greater or less portion of the primary circuit, and the service-wires are derived therefrom as required.

It is necessary that the difference of potential between the secondary conductors be maintained approximately constant throughout the length of the circuit. The converters C' C², &c., are therefore interposed between the primary and secondary conductors at the required intervals for securing this result. They are fastened to the posts or cross-arms in any convenient manner, and the primary conductors are connected through the primary coils, and the secondary coils are connected with the secondary conductors upon the lower cross-arms.

We claim as our invention—

1. The combination, with a line of poles and cross-arms upon the same, of primary conductors carried by the upper cross-arms, secondary conductors carried by the lower cross-arms, and converters supported between the cross-arms.

2. A system of circuits for secondary electrical distribution, in which the primary conductors extend above the secondary conductors, in combination with electric converters interposed between the pairs of conductors, substantially as described.

3. The combination of primary conductors, secondary conductors extending parallel therewith, conductors derived from the latter, translating devices supplied with currents thereby, and converters interposed between the primary and secondary conductors at the proper intervals for maintaining a constant difference of potential throughout the lengths of the latter.

In testimony whereof we have hereunto subscribed our names this 8th day of December, A. D. 1886.

HENRY M. BYLLESBY.
OLIVER B. SHALLENBERGER.

Witnesses:
CHARLES A. TERRY,
J. G. BACKOFEN.